United States Patent [19]

Tsurukawa et al.

[11] Patent Number: 4,950,061

[45] Date of Patent: Aug. 21, 1990

[54] DRIVE DEVICE FOR A VARIFOCAL LENS SYSTEM

[75] Inventors: Ikuya Tsurukawa, Yokohama; Kunihisa Yamaguchi; Kosaku Sawabe, both of Ichikawa, all of Japan

[73] Assignee: Ricoh Company, Ltd., Tokyo, Japan

[21] Appl. No.: 287,851

[22] Filed: Dec. 21, 1988

[30] Foreign Application Priority Data

| | | |
|---|---|---|
| Dec. 23, 1987 [JP] | Japan | 62-326069 |
| Dec. 23, 1987 [JP] | Japan | 62-326070 |
| Dec. 24, 1987 [JP] | Japan | 62-325247 |
| Dec. 26, 1987 [JP] | Japan | 62-328433 |
| Dec. 30, 1987 [JP] | Japan | 62-199789 |

[51] Int. Cl.⁵ .............................................. G02B 15/00
[52] U.S. Cl. .................................. 350/429; 350/255; 354/400
[58] Field of Search ................ 350/429, 255; 354/400, 354/409, 195.12

[56] References Cited

U.S. PATENT DOCUMENTS 4,847,650  7/1989  Iida et al. .............................. 354/400

*Primary Examiner*—Bruce V. Arnold
*Assistant Examiner*—Loha Ben
*Attorney, Agent, or Firm*—Oblon, Spivak, McClelland, Maier & Neustadt

[57] ABSTRACT

A device for driving a varifocal lens, includes a first group frame supporting the first group of lenses therein in a movable manner for focussing and supported with the lens barrel inside said fixed frame movably in parallel with said optical axis, a second group frame supporting the second group of lenses therein in a fixed manner and supported with the first group frame inside the first group frame movably in parallel with said optical axis, at least three driver screw members disposed within the fixed frame in parallel with optical axis, at least three driver gear members held in mesh with the driver screw members respectively, and a drive unit for driving the driver gear members to thereby move the lens barrel frame and the first group frame by a predetermined amount respectively.

24 Claims, 10 Drawing Sheets

DRIVE DEVICE FOR A VARIFOCAL LENS SYSTEM

BACKGROUND OF THE INVENTION

1. Field of the Invention

The present invention relates to a drive device for a varifocal lens system, and more particularly to a drive device for driving a varifocal lens system comprising a varifocal optical system which includes at least a first group of lenses and a second group of lenses both disposed on the same optical axis and having changeable focal length, the first group of lenses being used as a focusing lens group.

2. Description of the Prior Art

In these days, with progress in advanced electronics and electrically operated mechanisms for use in cameras, a variety of so-called varifocal cameras have been proposed which can set a plurality of focal lengths of a photo-taking optical system or modify the focal length thereof infinitely by a motor or the like energized upon one-touch operation. Hitherto, this type varifocal camera has generally been so designed that a cam ring having a cam groove defined therein is rotated to drive (move) a lens frame having a cam pin slidably fitted in the cam groove along the optical axis, to thereby vary the focal length.

While such a conventional device is advantageous in that the construction is relatively simple, it has suffered from a problem that the cam ring requires a high degree of machining accuracy, which pushes up the manufacturing cost, and the length of the cam ring along the optical axis cannot be reduced, which eventually prevents compact design of a mirror cylinder.

As disclosed in Japanese Patent Laying-Open No. 60-79314 (1985), it has also been proposed to provide a single drive screw in place of the cam ring, for driving a lens frame along the optical axis. This type drive device has, however, accompanied problems that a lens is hard to smoothly move because driving forces are concentrated on a portion of the lens frame, and that the lens frame is inclined and hence the lens plane, which has to remain vertical with respect to the optical axis, cannot hold its vertical posture, whereby the intended optical capability cannot be effected.

As an alternative, there is also known a device of the type that a lens frame, a lens barrel or the like is housed (fully retracted) into a stowed position by means of a cam ring for compact design.

In such a case, however, a cam member for driving the lens frame or the like into a stowed position must be provided in addition to a cam member for driving the lens frame or the like to change the focal length. This arises a problem of increasing a pressure angle of the cam. To solve this problem, the diameter of the cam ring must be enlarged. Eventually, the lens barrel is increased in its diameter, thereby making it difficult to achieve compact size on a whole.

Further, in order to solve the above problem, the inventors have previously invented a device comprising a lens barrel divided into a plurality of frames, in which a lens barrel frame is disposed inside a fixed frame, a first group frame for supporting a first group of lenses is disposed inside the lens barrel frame, and a second group frame for supporting a second group of lenses is disposed inside the first group frame, in such a manner that these lens barrel frames, first group frame and second group frame are all movable along the optical axis to separately advance and retract. In the course of developing this device, the inventors have faced a problem as to what is suitable means for driving the second group frame. As the simplest expedient, for example, it is conceivable to directly drive the second group frame through a speed reducing mechanism by a motor or the like, as a driving source, disposed on the fixed frame. But, since the amount of movement of the second group frame with respect to the fixed frame is fairly large, the drive mechanism becomes necessarily large in size and complicated, and adjustment of the gear ratios is troublesome. When driving forces are transmitted from the fixed frame to the second group frame disposed inside the lens barrel frame, another problem arises in that a cut-out must be bored in the lens barrel frame in size corresponding to the sum of amounts of relative movements of both the first group frame and the lens barrel frame, and hence dealing with changes in the amount of movement of the lens barrel frame becomes difficult.

As disclosed in Japanese Patent Laid-Open No. 60-79314 (1985), it has also been proposed to provide a single drive screw in place of the cam ring, for driving a lens frame along the optical axis This type drive device has, however, accompanied problems that a lens is hard to smoothly move because driving forces are concentrated on a portion of the lens frame, and that the lens frame is inclined and hence the lens plane, which has to remain vertical with respect to the optical axis, cannot hold its vertical posture, whereby the intended optical capability cannot be effected. In other words, the lens will lose its stable posture as it moves.

Moreover, in order to solve the problem of holding a vertical posture of the lens, it is further conceivable to use a plurality of driver screws. But this solution brings forth another new problem that a transmission mechanism for transmitting driving forces to the respective driver screws is complicated, or that the lens barrel frame and so on are increased in the diameter significantly. Stated otherwise, it is very difficult to incorporate the transmission mechanism under requirements of reducing the diameter of the lens barrel frame, without interrupting the effective light flux.

SUMMARY OF THE INVENTION

A first object of the present invention is to provide a drive device for a varifocal lens system which can be constructed in smaller size and also can steeply reduce the manufacturing cost as compared with the prior art, while allowing the focal length to be changed with high accuracy over a relatively wide range.

A second object of the present invention is, therefore, to provide a drive device for a varifocal lens system with which the focal length can be changed over a wide range while realizing a small-sized construction, the lens frame or the like can be housed into a stowed position, and the manufacturing cost can be reduced steeply.

A third object of the present invention is, therefore, to provide a drive device for a varifocal lens system which can drive the second group frame with an inexpensive and simple construction, and hence which can make the size smaller, improve the accuracy and reduce the manufacturing cost, while allowing a relatively large variable (zooming) range of the focal length.

A fourth object of the present invention is, therefore, to provide a drive device for a varifocal lens system which can reduce the diameter of the lens barrel frame without adversely affecting optical characteristics, and which can be constructed in smaller size on the whole and also can steeply reduce the manufacturing cost as compared with the prior art, while allowing the focal length to be changed with high accuracy over a relatively wide range.

A fifth object of the present invention is to provide a drive device for a varifocal lens system with which the focal length can quickly be changed over a relatively wide range with a high degree of accuracy, while realizing a small-sized construction, in particular which can substantially eliminate any mechanical play between the fixed frame and the lens barrel frame movable relative to each other and between the lens barrel frame and the first group frame movable relative to each other, which allows the lens barrel frame and the first group frame to be smoothly moved while holding those members, which must intrinsically remain perpendicular to the optical axis, in a substantially perpendicular posture, and further which enables to facilitate mechanical machining and reduce the manufacturing cost.

The first object of the invention can be achieved by a first device for driving a varifocal lens system, comprising;

a fixed frame fixed to a stationary member of an optical device, a lens barrel frame supported with the fixed frame inside the fixed frame movably along a predetermined optical axis, a first group of lenses for focussing arranged on the optical axis, a first group frame supporting the first group of lenses therein in a movable manner for focussing and supported with the lens barrel frame inside the fixed frame movably in parallel with the optical axis, a second group of lenses arranged on the optical axis, a second group frame supporting the second group of lenses therein in a fixed manner and supported with the first group frame inside the first group frame movably in parallel with the optical axis, at least three driver screw members disposed within the fixed framed in parallel with said optical axis and having the same screw pitch with each other, at least three driver gear members held in mesh with the driver screw members respectively, and a drive means for driving the drive gear members to thereby move said lens barrel frame and the first group frame by a predetermined amount respectively.

Advantages of the above-mentioned first device are to provide the device for driving a varifocal lens system which can reduce the manufacturing cost with the simplified construction and the facilitated mechanical machining, which can achieve the smaller size in a stowed state, while allowing the variable focal length to be changed over a relatively wide range, and which can move the lens barrel frame, the first group frame and others smoothly and lightly, without tilting the groups of lenses during operation of changing the focal length, so that the groups of lenses can be shifted with a high degree of accuracy.

The second object of the invention can be achieved by a second device for driving a varifocal lens system, comprising a detecting means for detecting a moving amount of the first group frame relative to the lens barrel frame along the optical axis, and a zooming cam supported to the first group frame rotatably around the optical axis and rotatably driven by the detecting means according to the moving amount, the second group frame being adapted to be subjected to restriction by the zooming cam in a zooming range where a zooming operation of the optical device is carried out, and not to be subjected to restriction by the zooming cam to thereby remain at a predetermined retracted position in a stowing range where a stowing operation of the optical device is carried out.

Advantages of the above-mentioned second device are to provide the device for the varifocal lens system which can reduce the manufacturing cost with the simplified construction and the facilitated mechanical machining, which can make smaller the axial size in a stowed state, while allowing the variable focal length to be changed over a relatively wide range, in particular which can set smaller the pressure angle of the zooming cam for restricting a position of the second group frame, thereby reducing the size of outer configuration of the zooming cam, and further which can move the lens barrel frame, the first group frame and others smoothly and lightly, without tilting the groups of lenses during operation of changing the focal length, so that the groups of lenses can be shifted with a high degree of accuracy.

The third object of the invention can be achieved by a third device for driving a varifocal lens system, comprising a detecting means for detecting a moving amount of the first group frame relative to the lens barrel frame along the optical axis, and a zooming cam supported to the first group frame rotatably around the optical axis and rotatably driven by the detecting means according to the moving amount, and the second group frame is adapted to be driven in a zooming manner by the rotation of the zooming cam, whereby the first group of lenses and the second group of lenses are positioned to the positional relationship corresponding to a predetermined focal length.

Advantages of the above-mentioned third device are to provide the device for the varifocal lens system which can reduce the manufacturing cost with the simplified construction and the facilitated mechanical machining, which can be stowed in very compact size when it is out of use, while allowing the variable focal length to be changed over a relatively wide range, and in particular with which the mechanism for locating the first and second groups of lenses to the positional relationship corresponding to the intended focal length can be made in smaller size and simpler construction.

The fourth object of the invention can be achieved by a fourth device for driving a varifocal lens system, comprising a driving means having a ring-like gear disposed coaxially with the optical axis and held in mesh with said at least three driver gear members, the ring-like gear having a circular central hole so as not to interrupt an effective light flux while the ring-like gear moves from one position on the optical axis corresponding to the longest focal length to the other position on the optical axis corresponding to the shortest focal length.

Advantages of the above-mentioned fourth device are to provide the device for the varifocal lens system with which the entire device can be constructed in smaller size and lower cost as compared with the prior art, while allowing the focal length to be changed with high accuracy over a relatively wide range. In particular, since the ring-like gear is used as a transmission mechanism adapted to transmit driving forces from the driver means to the pair of three driver screws for driving the lens barrel frame and the first group frame for zooming operation, and the ring-like gear is disposed on either the lens barrel frame or the first group frame coaxially with the optical axis to be movable together therewith along the optical axis, it is possible to simplify the transmission mechanism to a large extent, and to reduce the diameter of the ring-like gear without interrupting the effective light flux as compared with the case where the ring gear is fixedly disposed. As a result, the device can be reduced in its overall size.

The fifth object of the invention can be achieved by a fifth device for driving a varifocal lens system, comprising a first elastic member interposed between the fixed frame and the lens barrel frame for urging the lens barrel frame relative to the fixed member in order to eliminate substantially a mechanical play existing between the fixed frame and the lens barrel frame, and a second elastic member interposed between the lens barrel and the first group frame for urging the first group frame relative to the lens barrel frame in order to eliminate a mechanical play existing between the first group frame and the lens barrel frame.

Advantages of the above-mentioned fifth device are are to provide the drive device for the varifocal lens system with which the focal length can quickly be changed over a relatively wide range with a high degree of accuracy while realizing a small-sized construction, in particular which can substantially eliminate any mechanical play between the fixed frame and the lens barrel frame movable relative to each other and between the lens barrel frame and the first group frame movable relative to each other, which allows the lens barrel frame and the first group frame to be smoothly moved while holding those members, which must intrinsically remain perpendicular to the optical axis, in a substantially perpendicular posture, and further which enables to facilitate mechanical machining and reduce the manufacturing cost.

BRIEF DESCRIPTION OF THE DRAWINGS

FIGS. 6 through 8 are longitudinal sectional side views schematically illustrating three operating states of the embodiment shown in FIG. 1, respectively, in which; FIG. 6 shows a stowed state in which it is out of use, FIG. 7 shows a wide-scopic state in which the focal length is changed to the short focal length, and FIG. 8 shows a telescopic state in which the focal length is changed to the long focal length;

FIGS. 9 through 11 are schematic side views, partly broken away, for explaining operation of a first group frame and a second group frame in the embodiment shown in FIG. 1, in which: FIG. 9 corresponds to a telescopic state, FIG. 10 corresponds to a wide-scopic state, and FIG. 11 corresponds to a stowed state;

FIGS. 12 and 13 are schematic side views as viewed from a position on the optical axis in FIG. 1 toward a lens barrel rack, for explaining operation of a second group drive assembly comprising the lens barrel rack, a cam driving gear train and a first group cam, which are essential parts of the present invention, and a fine adjustment mechanism adapted to finely adjust the lens barrel rack, in which: FIG. 12 shows the zooming operation from a wide-scopic state to a telescopic state, and FIG. 13 shows the zooming operation from a telescopic state to a wide-scopic state;

FIGS. 16 and 17 are graphs for explaining operation and effect of lens barrel springs and first group springs, in which: FIG. 16 shows the case where the lens barrel springs and the first group springs are acting in the opposite directions, and FIG. 17 shows the case where the lens barrel springs and the first group springs are acting in the same direction.

DETAILED DESCRIPTION OF PREFERRED EMBODIMENT

One embodiment of the present invention will be described below in detail with reference to the accompanying drawings.

Figure 1:
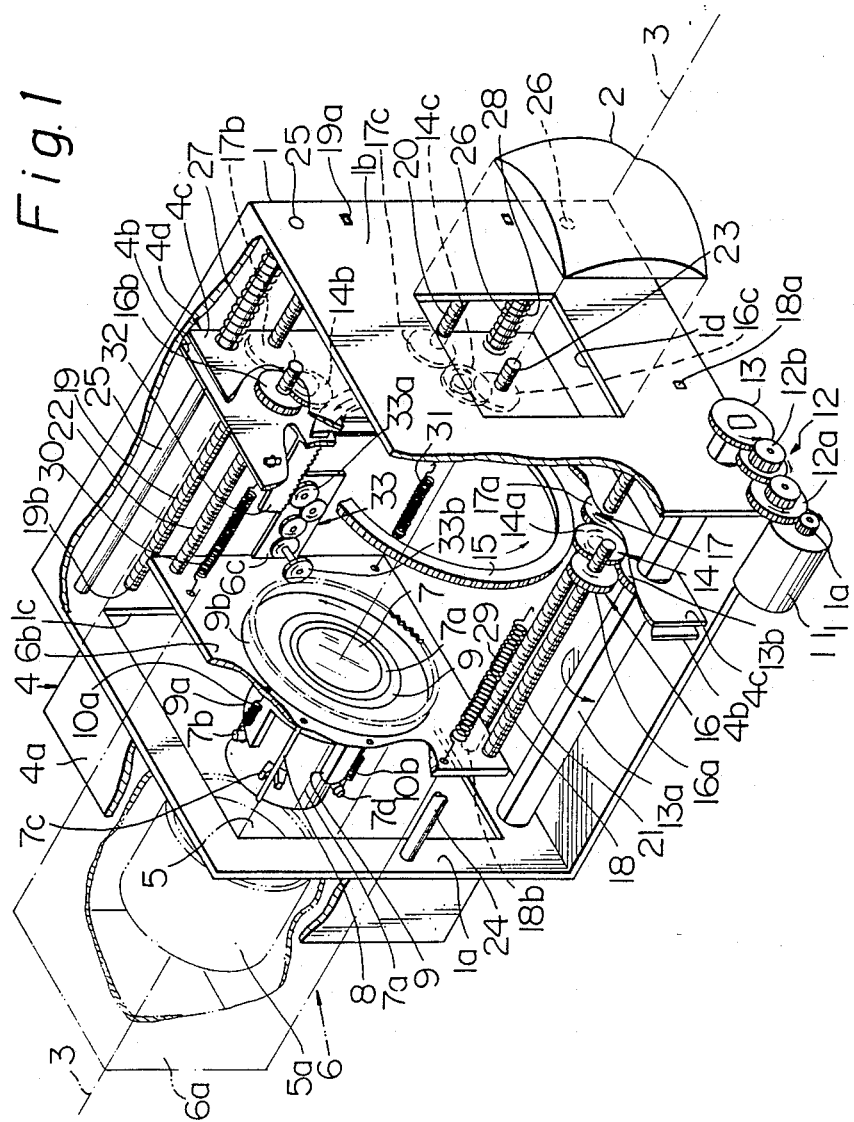
FIG. 1 is a perspective view, partly broken away, showing the overall construction of one embodiment of a drive device of a varifocal lens system according to the present invention.

FIG. 1 is a perspective view, partly broken away, showing the overall construction of one embodiment of a drive device of a varifocal lens system according to the present invention.

In FIG. 1, designated at reference numeral 1 is a fixed frame which is fixed to a stationary member (e.g., front plate) of a camera or the like, 3 is the optical axis penetrating substantially the center of the fixed frame 1, 1a and 1b are a front and rear plate provided at opposite ends of the fixed frame 1 on the sides near a subject and a film plane (both not shown) substantially perpendicular to the optical axis 3, respectively, and 1c and 1b are a front and rear window having a rectangular shape bored through the front and rear plate 1a, 1b, respectively, and allowing a later-described lens barrel frame to be inserted (advanced and retracted) therethrough.

Designated at 2 is a third lens disposed on the optical axis 3 at a position of the rear window 1d, and having the four peripheral edges, i.e., upper, lower, right-hand and left-hand peripheral edges, ground to flat planes parallel to the optical axis 3.

Designated at 4 is a lens barrel frame disposed inside the fixed frame 1 and supported movably along the optical axis 3, the frame 4 comprising barrel frame members 4a through 4c. Among them, 4a is a box-like lens barrel so positioned as to have its center aligned with the optical axis 3, 4b is a lens barrel first base plate comprising a plate-like member of size slightly larger than a sectional (transverse) area of the lens barrel 4a perpendicular to the optical axis 3, and disposed at the rear end of the lens barrel 4a substantially perpendicular to the optical axis 3, and 4c is a lens barrel second base plate formed almost similarly to the lens barrel first base plate 4b and disposed behind the first base plate 4b with a slight spacing left therebetween. Hereinafter, the lens barrel first and second base plates 4b, 4c will be referred to together as lens barrel base plates 4d dependent on cases.

Designated at 5 is a first group of lenses disposed on the optical axis 3 nearest to a subject (not shown), and 5a is a cylindrical first lens frame for fixedly supporting the first group of lenses 5 therein. Designated at 6 is a first group frame supported inside the lens barrel frame 4 to be movable in parallel with the optical axis 3, while supporting the first lens frame 5a therein, the first group frame 6 comprising frame members 6a, 6b and 6c. Among them, 6a is a rectangular parallelepiped tubular portion extending along the optical axis 3 and having a rectangular transverse section, 6b is a first group base plate disposed at the rear end of the tubular portion 6a and comprising a plate-like member with an area slightly larger than the transverse sectional area of the tubular portion 6a, and 6c is a gear supporting member rearwardly projecting from one side edge of the first group base plate 6b with a substantially right angle.

The first group of lenses 5 (first lens frame 5a) is movable on one hand together with movement of the first group frame 6, and also movable on the other hand independently of the first group frame 6 by a focusing mechanism (not shown) disposed inside the first group frame 6, so that it serves as a focusing lens.

Designated at 7 is a second group of lenses disposed on the optical axis 3 behind the first group of lenses 5, 7a is a cylindrical second group frame for fixedly supporting the second group of lenses 7 in alignment with the optical axis 3, 7b is a cam pin planted on the outer periphery of the second group frame 7a substantially perpendicular to the optical axis 3 and held in abutment with a cam surface described later, 7c is a slider provided also on the outer periphery of the second group frame 7a and having a forked portion to prevent rotation of the second group frame 7a while guiding its movement along the optical axis 3, and 7d is a spring retainer planted also on the outer periphery of the second group frame 7a. Designated at 8 is a second group frame guide, in the form of a bar, fixed to the first group frame 6 (specifically the first group base plate 6b) and slidably fitted in the forked portion of the slider 7c. Designated at 9 is a second group frame cam comprising a tubular member open at its opposite ends, fitted in a hollow bearing portion defined centrally of the first group base plate 6b while receiving the second group frame 7a fitted therein, and supported rotatably about the optical axis 3 while being prevented from moving along the optical axis 3. Designated at 9a is a cam surface defined at the front edge of the second group frame cam 9 and held in slide contact with the cam pin 7b, and 9b is a crown gear fixed to the rear end of the second group frame cam 9. Designated at 10a and 10b are second group springs respectively stretched under tension between the cam pin 7b and the first group base plate 6b and between the spring retainer 7d and the first group base plate 6b.

Designated at 11 is a motor, and 12 a speed reducing gear train driven by a prime gear 11a of the motor 11 and comprising a pair of speed reducing gears 12a, 12b. Designated at 13 is a driver gear having a nearly track-shaped hole defined at the center thereof and driven by the motor 11 through the speed reducing gear train 12, and 13a is a driver shaft comprising a bar-like member which has a nearly track-like shape in section, extends in parallel with the optical axis 3, and is supported rotatably at its opposite ends with the front plate 1a and the rear plate 1b of the fixed frame 1, respectively, with its intermediate portion inserted through bearing holes bored in the lens barrel base plates 4d, the end of the driver shaft 13a rearwardly projecting from the rear plate 1b being fixedly fitted in the nearly track-like hole of the driver gear 13. Designated at 13b is a movable gear held between the lens barrel first base plate 4b and the lens barrel second base plate 4c, and having a nearly track-like insertion hole through which the driver shaft 13a is inserted, so that upon transmission of torque of the driver shaft 13a, the movable gear 13b is subjected to the thread feeding action of a driver screw (described later) and movable together with the lens barrel base plates 4d along the optical axis 3.

Designated at 14a, 14b, 14c, 15, 16a, 16b, 16c, 17a, 17b and 17c are gears all rotatably held between the lens barrel first base plate 4b and the lens barrel second base plate 4c. Among them, 14a, 14b and 14c are double-ply gears each having an integral small-diameter gear on the front side of a large-diameter gear, and 16a, 16b, 16c, 17a, 17b and 17c are gears each having a central hole and female threads defined in the inner peripheral surface thereof. More specifically, 14a is a transmission gear in mesh with the movable gear 13b, 15 is a ring gear in mesh with the transmission gear 14a and having a large circular hole at the center which allows the photo-taking light flux to pass therethrough, 14b and 14c are transmission gears in mesh with the ring gear 15, 16a, 16b and 16c are first driver gears in mesh with the small-diameter gears of the transmission gears 14a, 14b and 14c, respectively, and 17a, 17b and 17c are lens barrel driver gears in mesh with the large-diameter gears of the transmission gears 14a, 14b and 14c, respectively.

Note that the transmission gears 14a, 14b, 14c will be referred to together as transmission gears 14, the first group driver gears 16a, 16b, 16c will be referred to together as first group driver gears 16, and the lens barrel driver gears 17a, 17b, 17c will be referred to together as lens barrel driver gears 17, respectively, hereinafter dependent on cases. These transmission gears 14, ring gear 15, lens barrel driver gears 17, and first group driver gears 16 jointly constitute a transmission mechanism.

Designated at 18 is a lens barrel cylinder driver screw extending in parallel with the optical axis 3, and supported non-rotatably at its opposite ends 18a, 18b with peripheral edge portions of the rear plate 1b and the front plate 1a with a slight play left therebetween, respectively. Right-hand threads, for example, defined in the outer peripheral surface of the screw 18 substantially throughout its length are held in mesh with the female threads of the lens barrel driver gear 17a. Likewise, designated at 19 is a lens barrel driver screw supported non-rotatably at its opposite ends 19a, 19b with the fixed frame 1 and held in mesh with the female threads of the lens barrel driver gear 17b, and 20 is also a lens barrel driver screw held in mesh with the female threads of the lens barrel driver gear 17c. Designated at 21, 22 and 23 are first group driver screws extending substantially in parallel with the optical axis 3 and supported non-rotatably at their front ends with peripheral edge portions of the first group base plate 6b with a slight play left therebetween, while being prevented from slipping off from the first group base plate 6b.

Left-hand threads, for example, defined in the outer peripheral surface of the screws 21, 22 and 23 substantially throughout their length are held in mesh with the female threads of the first group driver gear 16a, 16b and 16c, respectively. Note that the lens barrel driver screws 18 to 20 and the first group driver screws 21 to 23 jointly constitute a triple of driver screws.

Designated at 24, 25 and 26 are guide shafts extending in parallel with the optical axis 3 while penetrating through respective guide holes bored in the peripheral edge portions of the lens barrel base plates 4d, and fixed at their front and rear ends to the front and rear plates 1a, 1b (i.e., fixed plate 1), respectively.

Designated at 27 and 28 are lens barrel springs comprising coil springs under compression and fitted around the guide shafts 25, 26 between the lens barrel base plates 4d and the rear plate 1b, respectively (though not shown, another coil spring is also fitted around the guide shaft 24).

Designated at 29 to 31 are first group springs stretched between the first group base plate 6b and the lens barrel first base plate 4b for normally urging both plates towards each other.

Designated at 32 is a lens barrel rack extending in parallel with the optical axis 3, positioned inside the lens barrel 4a slightly apart away from its side wall (not shown), and projecting forwardly from the front surface of the lens barrel first base plate 4b. Designated at 33 is a cam driving gear train disposed on the gear supporting portion 6c, 33a is a gear which constitutes the first stage of the cam driving gear train 33 and is held in mesh with the lens barrel rack 32, and 33b is a coupling gear which constitutes the final stage of the cam driving gear train 33 and is held in mesh with the crown gear 9b.

Though not shown, it is further arranged that a plurality of guide shafts extending in parallel with the optical axis 3 and fixed to the lens barrel frame 4 are inserted through guide holes bored in the peripheral edge portions of the first group base plate 6b, for example, to thereby guide movement of the first group frame 6 along the optical axis 3.

The first group of lenses 5, the second group of lenses 7 and the third lens 2 jointly constitute a varifocal optical system.

Note that FIG. 1 shows a telescopic state where the focal length is set to the long focal length side.

Incidentally, one rotation of the lens barrel driver gears 17 and the first group driver gears 16 correspond to one pitch of the lens barrel driver screws 18 to 20 and the first group driver screws 21 to 23, respectively.

Figure 2:
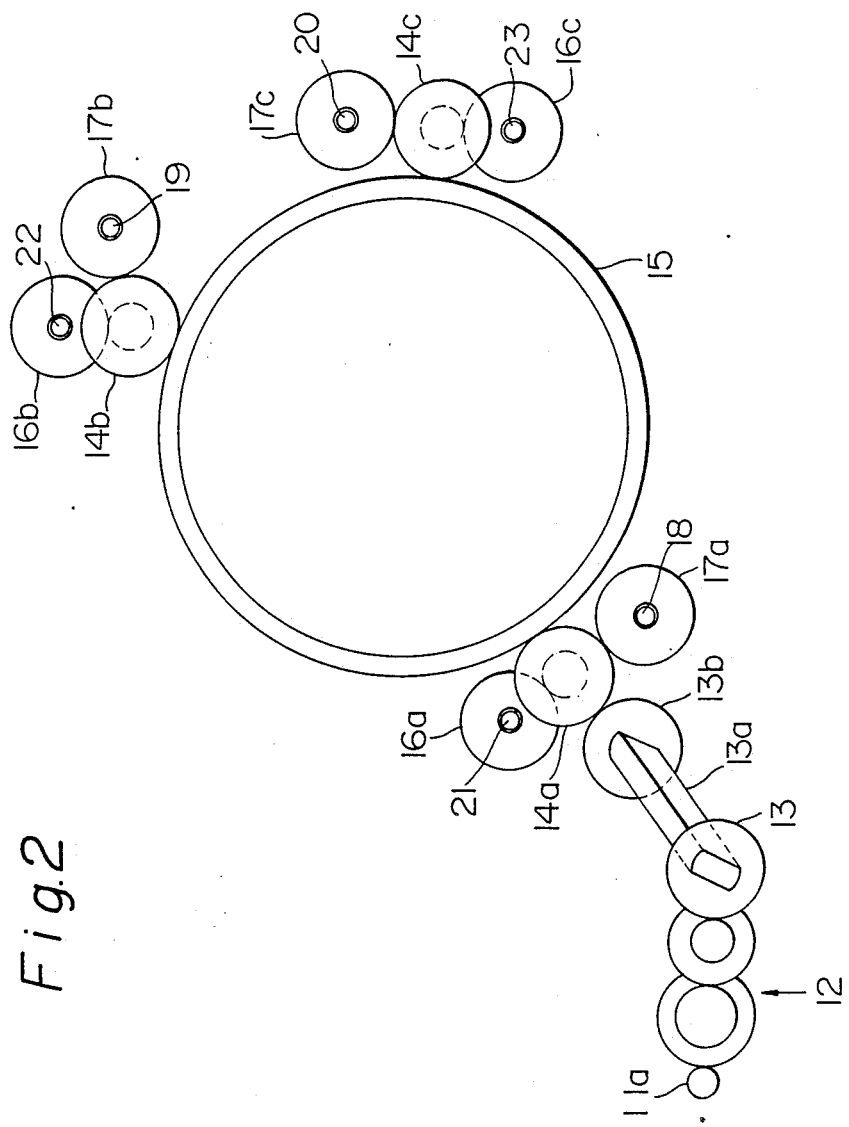
FIG. 2 is a schematic view of a transmission mechanism, as viewed from the rear side along the optical axis 3, showing a transmission path of driving forces (torque) of the embodiment shown in FIG. 1.

In the figures subsequent to FIG. 2, the same members as those in FIG. 1 are designated at the same reference numerals and description thereof will not be repeated.

FIG. 2 is a schematic view of the transmission mechanism, as viewed from the rear side along the optical axis 3, showing a transmission path of driving forces (torque).

Figure 3:
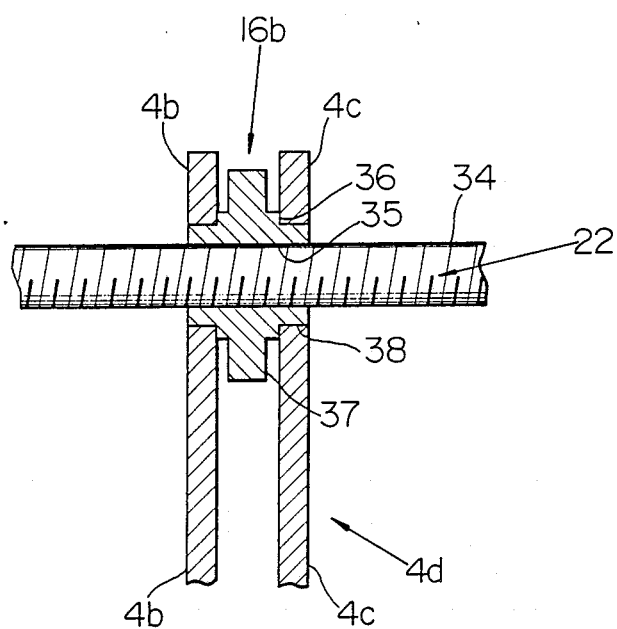
FIG. 3 is a longitudinal sectional side view showing the construction of a portion of the transmission mechanism in enlarged scale which includes a first group driver gear 16b in FIG. 1, as a representative by way of example.

FIG. 3 is a longitudinal sectional side view showing a portion of the transmission mechanism in enlarged scale which includes the first group driver gear 16b in FIG. 1, as a representative by way of example.

In FIG. 3, designated at 34 is a male thread portion of the first group driver screw 22, 35 is a female thread portion of the first group driver gear 16b, 36 is a stepped portion for reducing frictional forces received from the lens barrel base plates 4d upon thrust forces being produced on the first group driver gear 16b, 37 is a teeth portion of the first group driver gear 16b, and 38 is a cylindrical shaft portion centrally projecting from both opposite end faces of the first group driver gear 16b.

Figure 4:
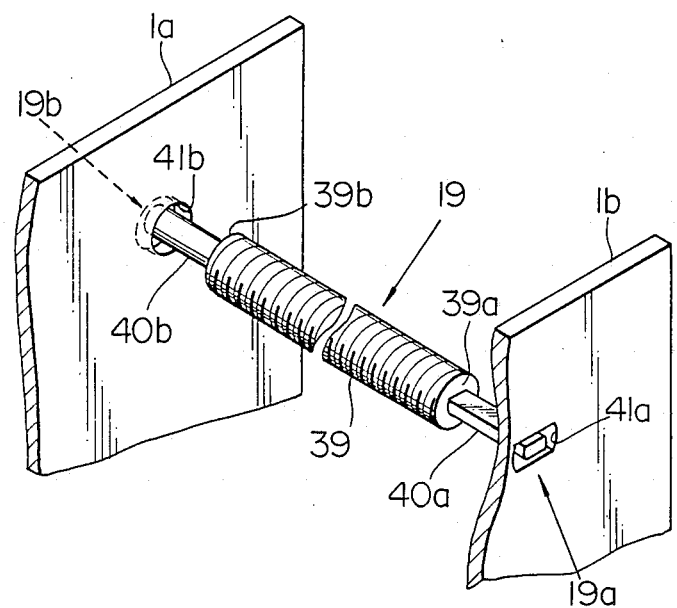
FIG. 4 is a perspective view showing the construction of both end portions of a lens barrel driver screw 19 in FIG. 1, in enlarged scale and in detail, as a representative by way of example.

FIG. 4 is a perspective view showing the construction of both end portions of the lens barrel driver screw 19 in FIG. 1, in enlarged scale, as a representative by way of example.

In FIG. 4, designated at 39 is a screw portion having male threads of the lens barrel driver screw 19 defined on the outer periphery surface thereof, 39a, 39b are rear and front end faces of the screw portion 39, respectively, 40a, 40b are a nearly track-like shaft and a round shaft integrally connected to the end faces 39a, 39b and having their sectional areas smaller than the diameter of the screw portion 39, respectively, and 41a, 41b are support holes respectively bored in the rear and front plates 1b, 1a, such that they have analogous shapes to those of the nearly track-like shaft 40a and the round shaft 40b and also have their sizes slightly larger than the diameters thereof, respectively. Note that for easy understanding, the nearly track-like shaft 40a and the round shaft 40b are illustrated exaggeratedly in their lengths. In the assembled state during practical use, the front plate 1a is held in slide contact with the end face 39b and the rear plate 1b is held in slide contact with the end face 39a, so that the lens barrel driver screw 19 is finely restricted in its axial position at its opposite ends 19a and 19b, while leaving a slight degree of freedom in the circumferential direction.

Figure 5:
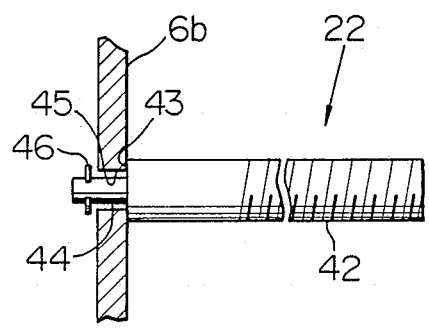
FIG. 5 is a longitudinal sectional view showing the construction of an end portion of a first group driver screw 22 in the embodiment shown in FIG. 1 on the side where it is supported to a first group base plate 6b, in enlarged scale and in detail, as a representative by way of example.

FIG. 5 is a longitudinal sectional side view showing the construction of an end portion of the first group driver screw 22 in FIG. 1 on the side where it is supported to the first group base plate 6b, in enlarged scale, as a representative by way of example.

In FIG. 5, designated at 42 is a screw portion of the first group driver screw 22, 43 is an end face of the screw portion 42, 44 is a shaft portion extending from the end face 43 to the shaft end and having a smaller diameter than the screw portion 42, 45 is a support hole bored in the first group base plate 6b through which the shaft portion 44 is inserted, and 46 is an E-shaped ring fitted in a circumferential groove formed in the part of the shaft portion 44 which is projecting from the first group base plate 6b. The E-shaped ring 46 is disposed in slide contact with or very close to the first group base plate 6b, and the support hole 45 has its inner diameter slightly larger than the outer diameter of the shaft portion 44 with a slight degree of freedom left in the diametrical direction. Further, the first group driver screw 22 is restricted in its axial position by the end face 43, and the E-shaped ring 46 serves to prevent the shaft portion 44 from slipping off from the first group base plate 6b.

Figure 6:
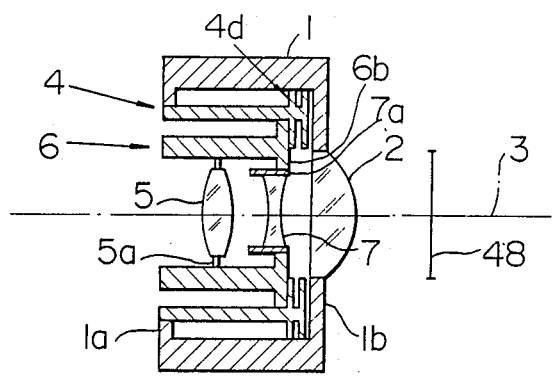
Figure 7:
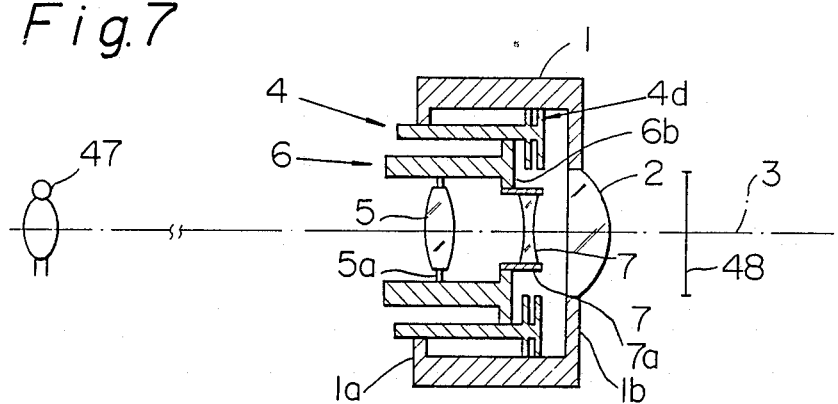
Figure 8:
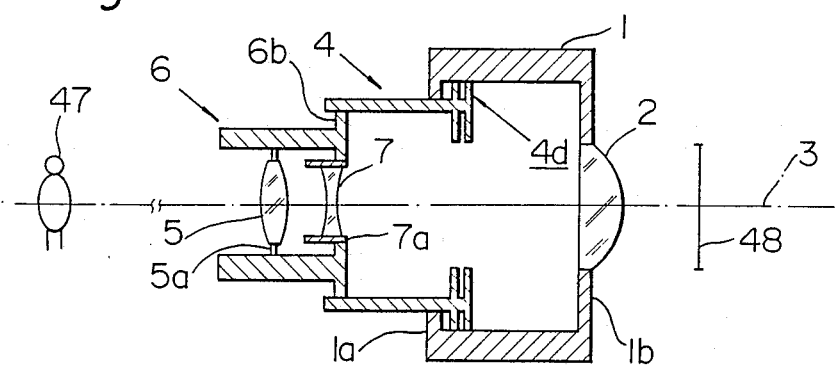

FIGS. 6 through 8 are longitudinal sectional side views schematically illustrating three operating states of the embodiment shown in FIG. 1, respectively, in which: FIG. 6 shows a stowed state in which it is out of use, FIG. 7 shows a wide-scopic state in which the focal length is changed to the short focal length, and FIG. 8 shows a telescopic state as mentioned above.

In FIGS. 6 through 8, designated at 47 is a subject positioned in front of the first group of lenses 5, and 48 is a film plane positioned behind the third lens 2. As mentioned in connection with FIG. 1, 5a is a first lens frame which is not fixed directly to the first group frame 6, but supported with the first group frame 6 such that it can be changed in its relative position to the first group frame 6 by means of the above suggested focusing mechanism provided on the first group frame 6. Thus, the first lens frame 5a is moved together with the first group frame 6 while the focusing mechanism is not operating, and it is movable along the optical axis 3 independently of the first group frame 6 when the focusing mechanism is operated.

Figure 9:
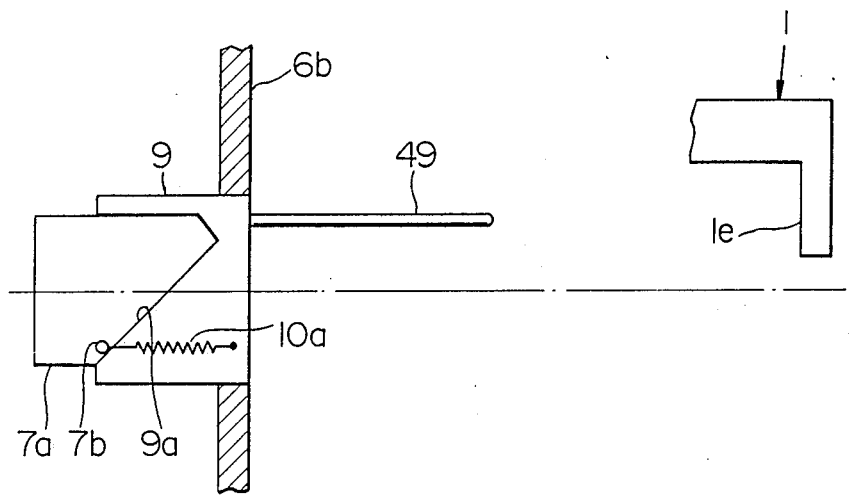
Figure 10:
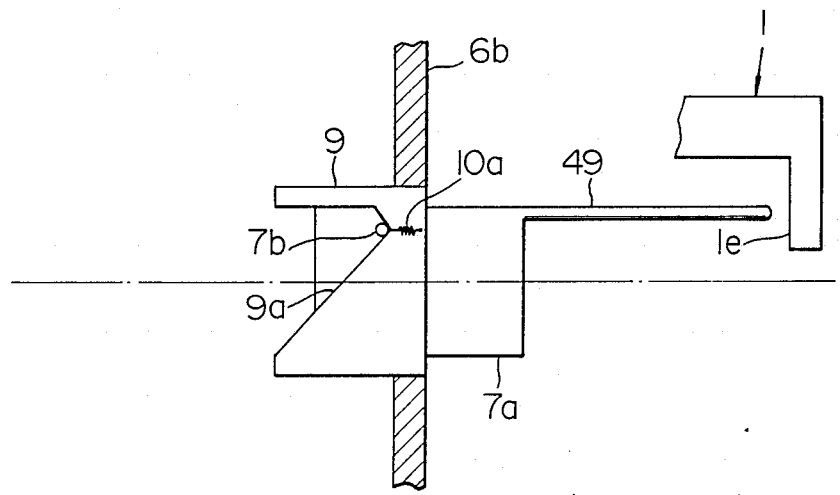
Figure 11:
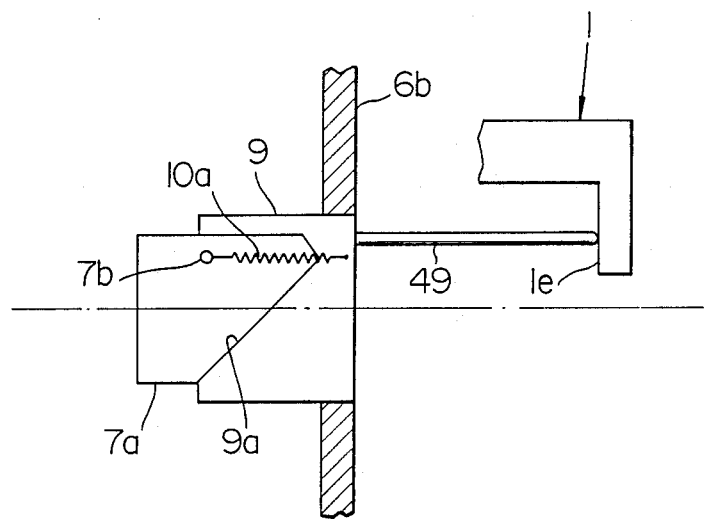

FIGS. 9 through 11 are schematic side views, partly broken away, showing construction of the first group frame 6 and the second group frame 7a, in which FIG. 9 shows a telescopic state, FIG. 10 shows a wide-scopic state, and FIG. 11 shows a stowed state. Note that although these figures are illustrated with the second group frame cam 9 as a stationary reference for easy understanding of the relationship between the cam surface 9a and the second group frame 7a, it is the second group frame cam 9 that is actually rotated, and it is the second group frame 7a that is linearly moved along the optical axis 3, as mentioned above.

In FIGS. 9 through 11, designated at 49 is a projection member projecting rearwardly from the second group frame 7a along the optical axis 3, and having its length which is terminated just short of a stopper 1e as a portion of the fixed frame 1 in a wide-scopic state.

Figure 12:
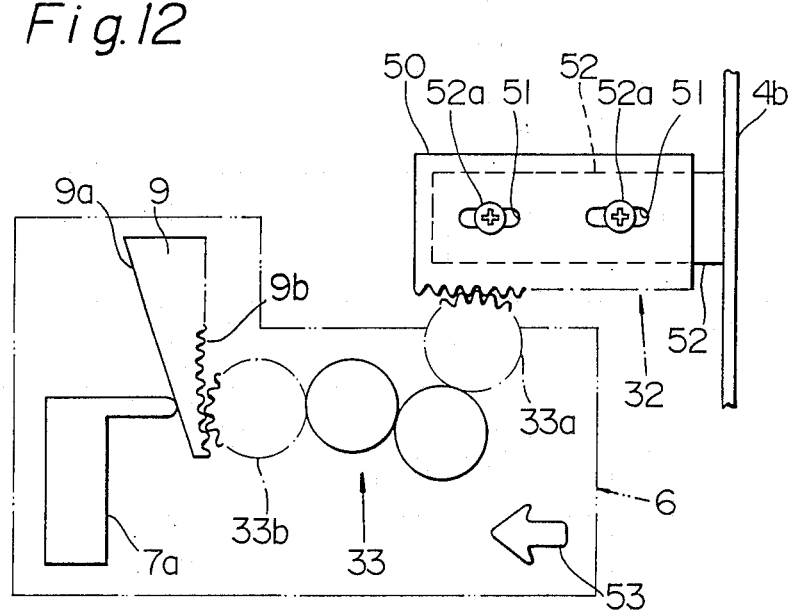
Figure 13:
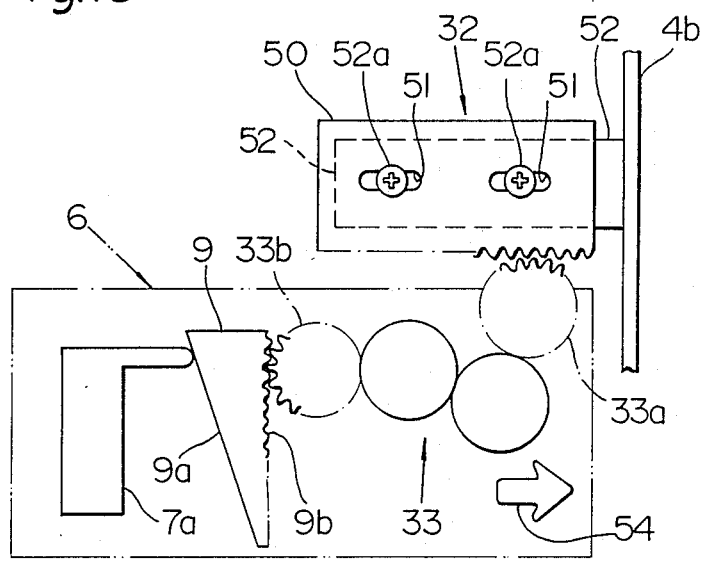

FIGS. 12 and 13 are schematic side views as viewed from a position on the optical axis 3 in FIG. 1 toward the lens barrel rack 32, for explaining operation of a second group drive assembly comprising the lens barrel rack 32, the cam driving gear train 33 and the second group frame cam 9, which are essential parts of the present invention, and a fine adjustment mechanism adapted to finely adjust the lens barrel rack 32, in which: FIG. 12 shows the zooming operation from a wide-scopic state to a telescopic state, and FIG. 13 shows the zooming operation from a telescopic state to a wide-scopic state. In FIGS. 12 and 13, designated at 50 is a rack body in mesh with the pinion 33a, 51 is an attachment hole in the form of an oblong hole which is bored in the rack body and elongate along the optical axis 3, and 52 is a rack support portion projecting forwardly from the lens barrel first base plate 4b with a substantially right angle. The rack support portion 52 has attachment threaded holes positioned corresponding to the attachment holes 51 and each having female threads defined therein. 52a is an attachment screw meshed with the above female threads for fixedly attaching the rack body 50 to the rack support portion 52. The rack support portion 52 and the rack body 50 jointly constitute the lens barrel rack 32 as mentioned in connection with FIG. 1.

Designated at 53 and 54 are arrows showing the direction in which the first group frame 6 is moved away from and toward the lens barrel frame 4 (specifically the lens barrel rack 32), respectively.

Having been omitted in the description of FIG. 1, the gear ratios of the cam driving gear train 33 is set dependent on various factors such as the axis-to-axis distance between the pinion 33a and the coupling gear 33b, the pressure angle of the cam surface 9a, and the rotational angle necessary for the second group frame cam 9.

Prior to explaining the action of the fine adjustment mechanism, operation of the second group drive assembly will first be described briefly. It is assumed in the description that the first group frame 6 is moved in the direction of the arrow 53, as shown in FIG. 12. The pinion 33a in mesh with the rack body 50 (that is, the lens barrel rack 32) is rotated clockwise, the rotation being transmitted through the cam driving gear train 33 in sequence, so that the coupling gear 33b is rotated counterclockwise. The crown gear 9b in mesh with the coupling gear 33b is moved downwardly as viewed in the figure, whereupon the second group frame 7a is shifted forwardly while being pushed by the cam surface 9a. Description of FIG. 13 will be omitted here because the above process is applied in an opposite way.

Operation of the fine adjustment mechanism will now be described. For example, while holding the positional relationship between the first group frame 6 and the lens barrel frame 4 (not shown, specifically the lens barrel rack 32 integral therewith) in a wide-scopic state as shown in FIG. 12, the two attachment screws 52a are first loosened. Then, by moving the rack body 50 to the left or right by a small amount in the figure, the second group frame cam 9 is rotated also by a small amount so that the second group frame 7a is advanced and retracted by a small amount. When the second group frame 7a is aligned with a predetermined reference position, the rack body 50 is fixedly fastened to the rack support portion 52 by tightening the attachment screws 52a.

Figure 14:
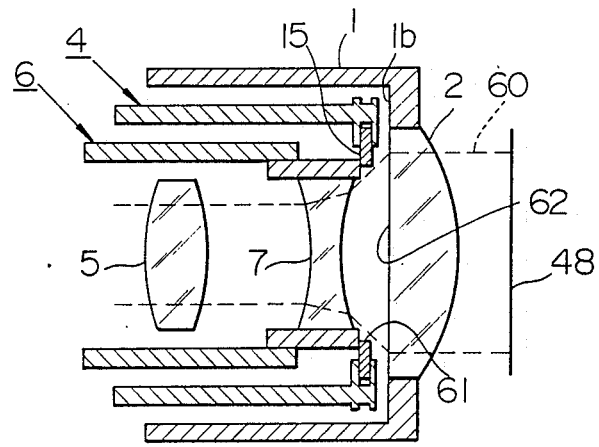
FIGS. 14 and 15 are longitudinal sectional side views schematically showing the positional relationship between the effective light flux and a ring gear in a wide-scopic state and a telescopic state, respectively.
Figure 15:
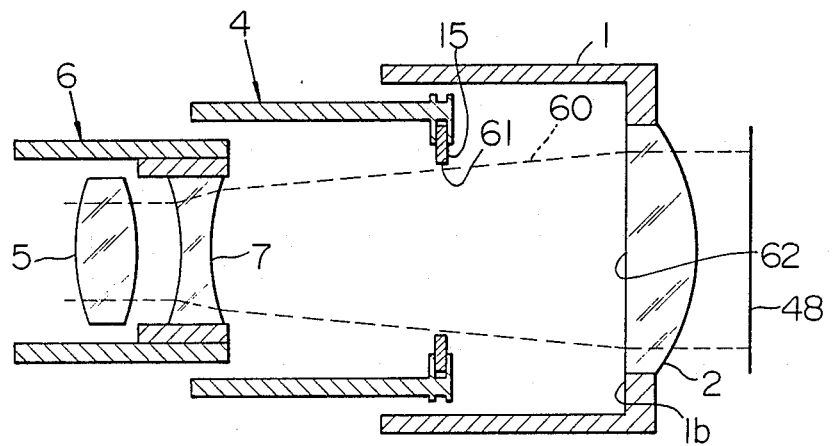

FIGS. 14 and 15 are longitudinal sectional side views schematically showing the positional relationship between the effective light flux and the ring gear, in which; FIG. 14 corresponds to a wide-scopic state and FIG. 15 corresponds to a telescopic state, respectively.

In FIGS. 14 and 15, designated at 60 is the effective light flux, 61 is an inner peripheral surface of the ring gear 15, and 62 is an incident surface of the third lens 2. In other words, the ring gear 15 is set such that the diameter of the inner peripheral surface 61 becomes a minimum value at which the ring gear 15 will not interfere with (interrupt) the effective light flux 60 in a wide-scopic state, as shown in FIG. 14.

Thus, the effective light flux 60 entering the third lens 2 has the maximum sectional area in a wide-scopic state, and the diameter of the inner peripheral surface 61 of the ring gear 15 is set not to interrupt the light flux in that state. Accordingly, since the effective light flux is gradually narrowed in the direction in which the ring gear 15 is moved away from the incident surface 62 of the third lens 2 (toward a telescopic state), the ring gear 15 will not interrupt the effective light flux 60 in a shift range from a wide-scopic state to a telescopic state. Stated otherwise, there results in an advantage that the diameter of the inner peripheral surface 61 is reduced and eventually the entire device (the lens barrel frame 4 and the fixed frame 6) is made smaller in size, as compared with the case where the ring gear 15 is attached to the fixed frame 1 (specifically the rear plate 1b) as a stationary member.

Figure 16:
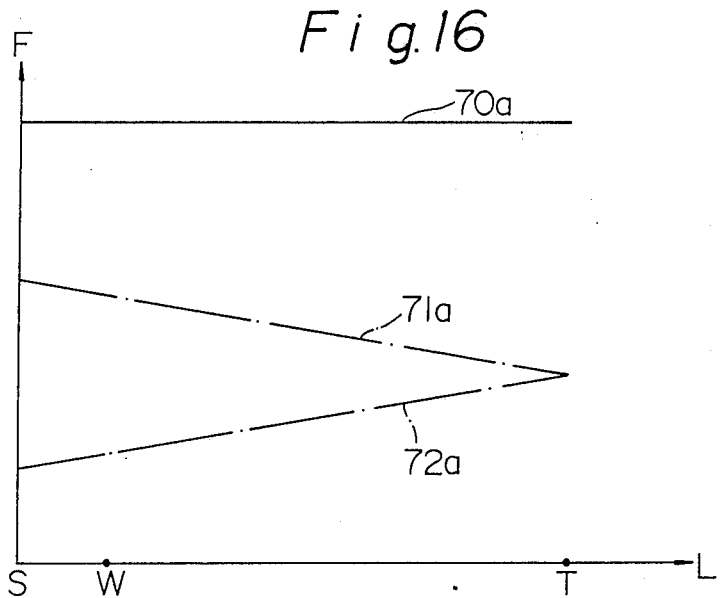
Figure 17:
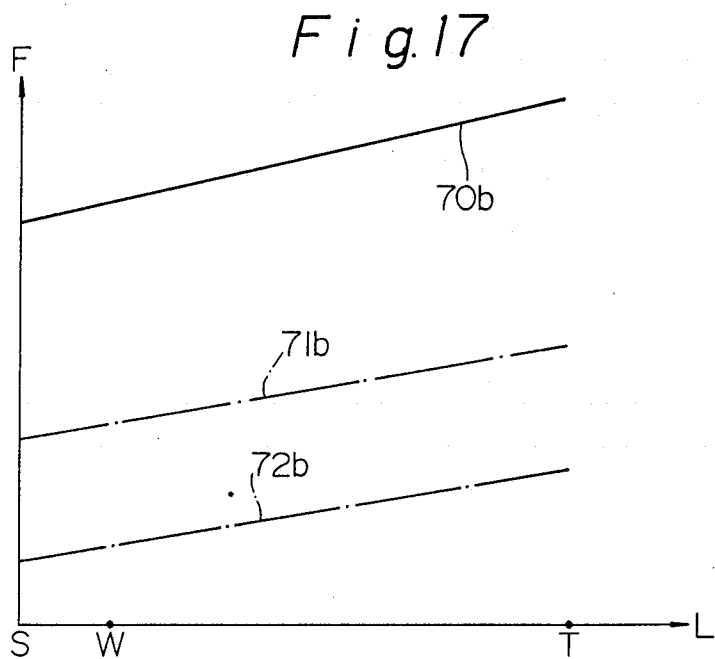

FIGS. 16 and 17 are graphs for explaining operation and effect of the lens barrel springs 27, 28 and the first group springs 29 to 31, in which: FIG. 16 shows the case where the lens barrel springs 27, 28 and the first group springs 29 to 31 are acting in the opposite directions, and FIG. 17 shows the case where the lens barrel springs 27, 28 and the first group springs 29 to 31 are acting in the same direction.

In FIGS. 16 and 17, the axis of ordinates F represents forces of the springs, while the axis of abscissas L represents positions of the frames 4, 6, 7a in the respective operating states, which correspond to distances along the optical axis 3 from the stowed position as a reference. Designated at S is the stowed position corresponding to a stowed state, and W, T are the wide-scopic and telescopic positions corresponding to wide-scopic and telescopic states, respectively. Designated at 70a, 70b are total loads, 71a, 71b are forces of the lens barrel springs 27, 28, and 72a, 72b are forces of the first group springs 29 to 31.

Operation of this embodiment thus constructed will be explained below.

To begin with, transmitting operation of torque will be described with reference to FIGS. 1 and 2. For example, when the prime gear 11a of the motor 11 is rotated clockwise, the driver gear 13 is rotated counterclockwise through the speed reducing gear train 12, and torque of the driver gear 12 causes the movable gear 13b to rotate counterclockwise through the driver shaft 13a. The transmission gear 14a in mesh with the movable gear 13b is rotated clockwise, and the ring gear 15 in mesh with the transmission gear 14a is rotated counterclockwise, so that the transmission gears 14b and 14c are rotated clockwise. Thus, the three transmission gears 14 are all rotated clockwise. Then, the three lens barrel driver gears 17 and the three first group driver gears 16 respectively in mesh with the three transmission gears 14 are all rotated counterclockwise. In other words, the lens barrel driver gears 17 and the first group driver gears 16 are rotated in the direction opposite to that of the prime gear 11a of the motor 11.

Short focal length selecting operation from a telescopic state shown in FIGS. 1, 8 and 9 to a wide-scopic state shown in FIGS. 7 and 10 will now be described. When the lens barrel driver gears 17 and the first group driver gears 16 are rotated counterclockwise as mentioned above, the lens barrel driver gears 17 are rotated about their axes and moved rearwardly along the optical axis 3 because the lens barrel driver screws 18 to 20 can neither move axially nor rotate, assuming that the lens barrel driver screws 18 to 20 in mesh with the respective female threads of the lens barrel driver gears 17 are right-handed screws. Upon movement of the lens barrel driver gears 17, the lens barrel base plates 4d, i.e., the lens barrel frame 4 starts to retract against urging forces of the lens barrel springs 27 and 28, while being guided by the guide shafts 24 to 26.

On the other hand, assuming that the first group driver screws 21 to 23 in mesh with the respective female threads of the first group driver gears 16 are left-handed screws, the first group driver gears 16 themselves tend to advance. However, because movement of the first group driver gears 16 along the optical axis 3 is restricted by the lens barrel base plates 4d, the first group driver screws 21 to 23 are eventually moved rearwardly along the optical axis 3. In other words, the first group frame 6 starts to retract by urging forces of the first group springs 29 to 31 while being guided by guide shafts (not shown). Thus, within the lens barrel frame 4 which is retracting relative to the fixed frame 1, the first group frame 6 is further retracted relative to the lens barrel frame 4.

Upon the above relative movement, i.e., when the first group base plate 6b is moved toward the lens barrel base plates 4d, the gear supporting portion 6c is retracted relative to the lens barrel rack 32, and the pinion 33a in mesh with the lens barrel rack 32 is rotated counterclockwise. That rotation is transmitted through the cam driving gear train 33 to rotate the coupling gear 33b clockwise, so that the crown gear 9b in mesh with the coupling gear 33b is rotated counterclockwise to rotate the second group frame cam 9 also counterclockwise. Upon this rotation, since the cam pin 7b held in slide contact with the cam surface 9a is pulled rearwardly by the second group springs 10a, 10b, the cam pin 7b tends to move obliquely toward the rear side along the inclination of the cam surface 9a. But, with the second group frame 7a allowed only to move linearly along the optical axis 3 by engagement between the slider 7c and the second group frame guide 8, the second group frame 7a is eventually moved toward the rear side in parallel with the optical axis 3.

When the cam pin 7b reaches a wide-scopic position (substantially V-shaped portion) of the cam surface 9a with further rearward movement, as shown in FIG. 10, the projected amount of the second group frame 7a projecting rearwardly from the first group base plate 6b becomes maximum, and the distal end of the projection member 49 is positioned just short of the stopper 1e of the fixed frame 1. This result is such a wide-scopic state, as shown in FIG. 7, that the front end of the lens barrel frame 4 (specifically the lens barrel 4a) is positioned slightly forwardly of the front frame 1a of the fixed frame 1, the first group frame 6 (specifically the tubular portion 6a) is positioned slightly forwardly of the front end of the lens barrel 4a, and the second group frame 7a is retracted by the above projected amount toward the rear side.

Next, stowing operation from a wide-scopic state shown in FIGS. 7 and 10 to a stowed state shown in FIGS. 6 and 11 will be described. The lens barrel driver gears 17 and the first group driver gears 16 are rotated counterclockwise in a like manner to the above. Accordingly, the lens barrel frame 4 and the first group frame 6 continue to retract as mentioned above. But, upon distal end of the projection member 49 abutting with the stopper 1e of the fixed frame 1 as shown in FIG. 11, the second group frame 7a cannot retract further and remains left at that position, while the first group frame (the first group base plate 6b) and the lens barrel frame 4 can retract further so that the cam pin 7b is relatively spaced forwardly from the cam surface 9a against resilient forces of the second group springs 10a, 10b. Thus, there results in a stowed state, as shown in FIG. 6, that respective front ends of the lens barrel frame 4 and the first group frame 6 are substantially aligned with the front plate 1a, and the projected amount of the second group frame 7a toward the rear side becomes minimum (nearly zero), i.e., that the rear end of the second group frame 7a is substantially aligned with the first group base plate 6b.

Long focal length selecting operation from the foregoing stowed state to a telescopic state shown in FIGS. 1, 8 and 9 will now be described.

By energizing the motor 11 with current inverted in the polarity, the prime gear 11a is rotated counterclockwise so that the lens barrel driver gears 17 and the first group driver gears 16 are all rotated clockwise. Accordingly, the lens barrel frame 4 is shifted forwardly, and the first group frame 6 is shifted further forwardly relative to the advancing lens barrel frame 4. With attention now paid to only the first group frame 6 and the second group frame 7a, as shown in FIGS. 11 and 10, although the first group frame 6 (the first group base plate 6b) is advanced, the second group frame 7a remains left in that position, because it is pulled by the second group spring 10a toward the first group base plate 6b. Thus, only the first group frame 6 is advanced until it reaches the position shown in FIG. 10, and thereafter the second group frame 7a is brought into under restriction of the second group frame cam 9. In other words, the second group frame 7a is not subjected to restriction by the cam surface 9a during the range between a stowed state and a wide-scopic state.

With further advance of the lens barrel frame 4 and the first group frame 6, the crown gear 9b is rotated clockwise, whereupon the cam pin 7b held in slide contact with the cam surface 9a is pushed obliquely to the front side. This movement of the cam pin 7b is actually converted to linear movement alone by engagement between the slider 7c and the second group frame guide 8, so that the second group frame 7a is shifted forwardly. This finally result in such a telescopic state, as shown in FIGS. 8 and 1, that the lens barrel frame 4 and the first group frame 6 are shifted forwardly by the nearly maximum advanced amounts with respect to the fixed frame 1 and the lens barrel frame 4, respectively, and the second group frame 7a is also shifted forwardly by the nearly maximum advanced amount with respect to the first group base plate 6b with the rear end of the second group frame 7a aligned with the first group frame 6.

Thus, this embodiment is so arranged that inside the lens barrel frame 4 supported movably along the three guide shafts 24 to 26 secured to the fixed frame 1 substantially in parallel with the optical axis 3, there is movably supported the first group frame 6 supporting therein the first group of lenses 5 by a plurality of guide shafts (not shown) fixed in the lens barrel frame 4 substantially in parallel with the optical axis 3, and the second group frame 7a supporting therein the second group of lenses 7 is supported movably back and forth inside the second group frame cam 9. In addition, the transmission mechanism driven through the driver shaft 13a and the movable gear 13b causes the lens barrel frame 4 to advance and retract by means of the three lens barrel driver screws 18 to 20, and at the same time the first group frame 6 is caused to advance and retract by means of the three first group driver screws 21 to 23, so that the second group frame 7a is advanced and retracted using the amount of relative movement between the lens barrel frame 4 and the first group frame 6. Therefore, an advantage can be obtained which eliminates a drawback in the prior art that movement of the lens barrel frame 4 and the first group frame 6 makes the postures of the first and second groups of lenses 5, 7 unstable.

Further, since the lens barrel frame 4 and the first group frame 6 are advanced and retracted with respect to the fixed frame 1 in a manner of double action, the entire device has a length along the optical axis 3 substantially equal to that of the fixed frame 1 and hence has the very small size in a stowed state, while allowing the large zooming ratio of the varifocal optical system. Moreover, since it is so arranged that the second group frame 7a is not driven (restricted) by the cam surface 9a of the second group frame cam 9, the pressure angle of the cam surface 9a can be made smaller, resulting in an advantage that the diameter of the second group frame cam 9 can be reduced and the more compact
m size of the entire device can be achieved.

In addition, a cam ring which has often been used in the past is not employed for movement of the lens barrel frame 4 and the first group frame 6, resulting in an advantage that the cost necessary for manufacturing such cam ring can be saved and hence the device can be manufactured inexpensively.

The moved amounts of the first group frame 6 and the lens barrel frame 4 are easily set by selecting the gear ratio of the transmission gears 14 each comprising a double-ply gears. This results in an advantage that the degree of freedom in design is large.

Also, the moved amounts of the first group frame 6 and the lens barrel frame 4 can be set optionally by changing respective screw pitches of the lens barrel driver screws 18 to 20 and the first group driver screws 21 to 23. This results in an advantage that the degree of freedom in design, e.g., the degree of freedom in preparing a space necessary for accommodating a mechanism to prevent leakage of light, etc.

Further, the lens barrel driver screws 18 to 20 are exactly restricted in their axial positions at the opposite ends 18a, 19a and 18b, 19b, while leaving an appropriate play (allowance) in the radial direction. Therefore, even if manufacture errors are produced in the first group driver screws 21 to 23, the lens barrel driver gears 17 and the first group driver gears 16 respectively in mesh with the first group driver screws 21 to 23, as well as the entire transmission mechanism, there occurs no forcible forces exerting on those parts, resulting in an advantage that smooth operation can be obtained and a fear of overload of the motor 11 or the like is eliminated.

Since one rotation of the lens barrel driver gears 17 and the first group driver gears 16 corresponds to one pitch of the lens barrel driver screws 18 to 20 and the first group driver screws 21 to 23, an advantage is obtained in the improved accuracy of shift operation.

Since those members such as the motor 11, etc. which require a large installation space are secured as stationary members to the fixed frame 1, an advantage is obtained in no need of a large space in which those members are to be moved.

Another advantage is in that the operation time can be shortened, because the lens barrel frame 4, the first group frame 6 and the second group frame 7a are shifted not in time-series fashion (sequentially), but simultaneously.

The second group springs 10a, 10b, the lens barrel springs 27, 28 and the first group springs 29 to 31 are so arranged that backlash, mechanical play or the like associated with the lens barrel driver screws 18 to 20 and the first group driver screws 21 to 23 are biased to one side. Thus, any adverse effect of backlash or the like can be eliminated.

Note that the present invention is not limited to the foregoing embodiment and can be practiced in various forms without departing from a scope of the present invention.

For example, it is a matter of course that the lens barrel driver screws 18 to 20 and the first group driver screws 21 to 23 are not necessarily required to be right handed and left-handed, respectively, and may be embodied otherwise in conformity with specification of the transmission mechanism.

As to the springs used in the foregoing embodiment, the lens barrel springs 27, 28 comprise springs under compression, and the second group springs 10a, 10b as well as the first group springs 29 to 31 comprise springs under tension. But, by properly selecting the way of stretching, the respective springs may comprise those springs having opposite functions to the above ones.

Further, the section of the driver shaft 13a is not limited to a nearly track-like shape, and may have any other shape, such as splines, taking into account fitness to the driver gear 13 and the movable gear 13b.

The crown gear 9b and the coupling gear 33b may be in the form of bevel gears.

In addition, the mechanism of detecting the moved amount is not limited to the illustrated one comprising the lens barrel rack 32 and the pinion 33a. It is essential that the detection mechanism needs only to detect a relative displacement between the lens barrel frame 4 and the first group frame 6, and then transmit the detected displacement to the second group frame 7a.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for driving a varifocal lens system, comprising;
   a fixed frame fixed to a stationary member of an optical device,
   a lens barrel frame movably supported inside said fixed frame along a predetermined optical axis,
   a first group of lenses for focusing arranged on said optical axis,
   a first group frame fixedly supporting said first group of lenses for focusing, said first group frame being movably supported within said lens barrel frame along said optical axis,
   a second group of lenses arranged on said optical axis for zooming,
   a second group frame supporting said second group of lenses therein in a fixed manner and supported with said first group frame inside said first group frame movably in parallel with said optical axis,
   at least three driver screw members disposed within said fixed frame in parallel with said optical axis and having the same screw pitch with one another,
   at least three driver gear members held in mesh with said driver screw members, respectively, and
   a drive means for driving said at least three driver gear members to thereby move said lens barrel frame and said first group frame by a predetermined amount respectively.

2. A device according to claim 1, wherein said at least three driver screw members comprise at least three first driver screws supported with said fixed frame in parallel with said optical axis and at least three second driver screws supported with said first group frame in parallel with said optical axis, said first driver screws and said second driver screws being different in screw direction from each other, said at least three driver gear members comprise at least three first driver-gears held in mesh with said first driver screws respectively and at least three second driver gears held in mesh with said second driver screws respectively, said lens barrel frame has two base plates with interposed said first driver gear and said second driver gears interposed therebetween, and said drive means is adapted to drive said first driver gears and said second driver gears.

3. A device according to claim 2, wherein said first driver screws and said second driver screws are different in screw pitch from each other.

4. A device according to claim 2, wherein said first driver screws and said second driver screws are identical in screw pitch with each other.

5. A device according to claim 4, wherein said drive means comprises at least three double-ply idler gears, each being held in mesh with a first driver gear at an idler gear thereof and held in mesh with a second driver gear of another idler gear thereof, respectively.

6. A device according to claim 2, wherein said first driver screws are supported with said fixed frame with a slight degree of freedom left in a perpendicular direction to said optical axis, and said second driver screws are supported with said first group frame with a slight degree of freedom left in said perpendicular direction.

7. A device according to claim 1, wherein said device further comprises a detecting means for detecting a moving amount of said first group frame relative to said lens barrel frame along said optical axis, and a zooming cam supported to said first group frame rotatably around said optical axis and rotatably driven by said detecting means according to said moving amount, and said second group frame is adapted to be driven in a zooming manner by the rotation of said zooming cam, whereby said first group of lenses and said second group of lenses are positioned to the positional relationship corresponding to a predetermined focal length.

8. A device according to claim 7, wherein said detecting means comprises a lens barrel rack fixed to said lens barrel frame in such a manner that the fixed position along said optical axis can be adjusted minutely, and a pinion gear rotatably supported with said first group frame and held in mesh with said barrel rack.

9. A device according to claim 1, wherein said device further comprises a detecting means for detecting a moving amount of said first group frame relative to said lens barrel frame along said optical axis, and a zooming cam supported to said first group frame rotatably around said optical axis and rotatably driven by said detecting means according to said moving amount, said second group frame is adapted to be subjected to restriction by said zooming cam in a zooming range where a zooming operation of said optical device is carried out, and not to be subjected to restriction by said zooming cam to thereby remain at a predetermined retracted position in a stowing range where a stowing operation of said optical device is carried out.

10. A device according to claim 9, wherein said detecting means comprises a lens barrel rack fixed to said lens barrel frame in such a manner that the fixed position along said optical axis can be adjusted minutely, and a pinion gear rotatably supported with said first group frame and held in mesh with said barrel rack.

11. A device according to claim 1, wherein said drive means comprises a ring like gear disposed coaxially with said optical axis and held in mesh with said at least three driver gear members, said ring-like gear having a circular central hole so as not to interrupt an effective light flux while said ring-like gear moves from one position on said optical axis corresponding to the longest focal length to another position on said optical axis corresponding to the shortest focal length.

12. A device according to claim 11, wherein said at least three driver screw members comprise at least three first driver screws supported with said fixed frame in parallel with said optical axis and at least three second driver screws supported with said first group frame in parallel with said optical axis, said first driver screws and said second driver screws being different in screw direction from each other, said at least three driver gear members comprise at least three first driver gears held in mesh with said first driver screws respectively and at least three second driver gear held in mesh with said second driver screws respectively, said lens barrel frame has two base plates with interposed said first driver gears and said second driver gears interposed therebetween, and said drive means is adapted to drive said first driver gears and said second driver gears.

13. A device according to claim 12, wherein said ring-like gear is interposed between said two base plates and held in mesh with at least three double-ply idler gears, each being held in mesh with a first driver gear at one idler gear thereof and held in mesh with said second driver gear at another idler gear thereof, respectively.

14. A device according to claim 1, wherein said device further comprises a first elastic member interposed between said fixed frame and said lens barrel frame for urging said lens barrel frame relative to said fixed member in order to eliminate substantially a mechanical play existing between said fixed frame and said lens barrel frame, and a second elastic member interposed between, said lens barrel frame and said first group frame for urging said first group frame relative to said lens barrel frame in order to eliminate a mechanical play existing between said first group frame and said lens barrel frame.

15. A device according to claim 14, wherein said first elastic member and said second elastic member have urging forces in different directions.

16. A device according to claim 14, wherein said first elastic member comprises at least three first coil springs bridged between said fixed frame and said lens barrel frame, and said second elastic member comprises at least three second coil springs bridged between said lens barrel frame and said first group frame.

17. A device according to claim 1, wherein said optical device comprises a camera.

18. A device according to claim 1, wherein said driver means comprises a motor.

19. A device for driving a varifocal lens system of an optical device, comprising:
   a fixed frame fixed to said optical device;
   a first frame movable along a predetermined optical axis and supported inside said fixed frame;
   a first group of lenses arranged on said optical axis and supported by and inside of a second frame wherein said first frame supports said second frame inside said fixed frame and wherein said second frame is movable along said optical axis;
   a second group of lenses arranged on said optical axis and supported by a third frame in a fixed manner wherein said third frame is supported with and inside said second frame movably in parallel with said optical axis;
   a first plurality of driver members disposed within said fixed frame in parallel with said optical axis;
   a second plurality of driver members cooperating with said first plurality of driver members respectively; and
   a drive means for moving said second plurality of driver members to move said first frame and said second frame by a predetermined amount, respectively.

20. The device according to claim 19, wherein said first plurality of driver members includes at least three driver screw members having the same screw pitch with one another.

21. The device according to claim 20, wherein said second plurality of driver members includes at least three driver gear members held in mesh with said driver screw members, respectively.

22. The device according to claim 19, wherein said drive means includes a ring-like gear disposed coaxially with said optical axis and held in cooperation with said second plurality of driver members, said ring-like gear having a circular central hole so as not to interrupt an effective light flux while said ring-like gear moves from one position on said optical axis corresponding to the longest focal length to a second position on said optical axis corresponding to the shortest focal length.

23. The device according to claim 19, wherein said first frame is a lens barrel frame, wherein said second frame supporting said first group of lenses in a movable manner for focusing, and wherein said third frame supports said second group of lenses therein in a fixed manner.

24. A device for driving a varifocal lens system of an optical device, comprising:
   a first lens means for focusing arranged on a predetermined optical axis in a movable manner and fixedly supported within a first barrel movable relative to and inside a fixed barrel;
   a second lens means arranged on said optical axis in a fixed manner on a second barrel, said second barrel being movable inside said first barrel along said optical axis for zooming;
   at least three driver screw members disposed within said optical device in parallel with said optical axis;
   at least three driver gear members held in mesh with said driver screw members respectively; and
   a driver means for driving said driver gear members to thereby move said first lens means by a predetermined amount.

* * * * *